United States Patent
Jung et al.

(10) Patent No.: US 6,181,467 B1
(45) Date of Patent: Jan. 30, 2001

(54) OPTICAL FIBER AMPLIFIER USING SYNCHRONIZED ETALON FILTER

(75) Inventors: Yun-Chel Jung, Taejonkwangyok-shi; Chel-Han Kim, Puchon-shi, both of (KR)

(73) Assignee: Samsung Electronics Co., Ltd., Kyungki-do (KR)

( * ) Notice: Under 35 U.S.C. 154(b), the term of this patent shall be extended for 0 days.

(21) Appl. No.: 09/208,850

(22) Filed: Dec. 10, 1998

(30) Foreign Application Priority Data

Dec. 10, 1997 (KR) .................................................. 97-67400

(51) Int. Cl.[7] ....................................................... H01S 3/00
(52) U.S. Cl. .................................................................. 359/341
(58) Field of Search ..................................... 359/341, 124

(56) References Cited

U.S. PATENT DOCUMENTS

| | | |
|---|---|---|
| 5,260,823 | 11/1993 | Payne et al. . |
| 5,280,383 | 1/1994 | Federichi et al. . |
| 5,295,217 | 3/1994 | Marcerou et al. . |
| 5,434,877 | 7/1995 | Chung . |
| 5,440,417 | 8/1995 | Chung et al. . |
| 5,497,265 | 3/1996 | Fontana et al. . |
| 5,521,753 | 5/1996 | Fake et al. . |
| 5,550,671 | 8/1996 | Simpson et al. . |
| 5,566,018 | 10/1996 | Lee et al. . |
| 5,623,362 | 4/1997 | Mitsuda et al. . |
| 5,664,131 | 9/1997 | Sugiya . |
| 5,677,786 | 10/1997 | Meli . |
| 5,701,194 | 12/1997 | Meli et al. . |
| 5,710,659 | 1/1998 | Cline . |
| 5,778,132 | 7/1998 | Csipkes et al. . |
| 5,808,787 | 9/1998 | Meli et al. . |
| 5,808,788 | 9/1998 | Park et al. . |
| 5,815,308 | 9/1998 | Kim et al. . |
| 5,815,518 | 9/1998 | Reed et al. . |
| 5,831,754 | 11/1998 | Nakano . |
| 5,838,487 | 11/1998 | Nilsson et al. . |

OTHER PUBLICATIONS

Chung and Stulz, "Synchronized Etalon Filters for Standardizing WDM Transmitter Laser Wavelengths", IEEE, 1993.*

Kim et al, "Two–Stage Optical Limiting Fiber Amplifier Using a Synchronized etalon filter", IEEE, pp. 131–133, 1997.*

* cited by examiner

*Primary Examiner*—Mark Hellner
(74) *Attorney, Agent, or Firm*—Robert E. Bushnell, Esq.

(57) ABSTRACT

A multi-stage optical fiber amplifier having a high gain, a high output power and a low noise figure, without limiting a gain bandwidth includes at least two stages of cascade connected optical fiber amplifiers. A synchronized etalon filter is disposed between the optical fiber amplifiers. The etalon filter has a resonant frequency matched with a standard frequency of a WDM (Wavelength Division Multiplexing) system using the optical fiber amplifiers.

8 Claims, 6 Drawing Sheets

OPTICAL FIBER AMPLIFIER USING SYNCHRONIZED ETALON FILTER

CLAIM OF PRIORITY

This application makes reference to, incorporates the same herein, and claims all benefits accruing under 35 U.S.C. §119 from an application for OPTICAL FIBER AMPLIFIER USING SYNCHRONIZED ETALON FILTER earlier filed in the Korean Industrial Property Office on Dec. 10, 1997 and there duly assigned Ser. No. 67400/1997.

BACKGROUND OF THE INVENTION

1. Field of the Invention

The present invention relates to an optical amplifier for use in a long-distance optical transmission system and an optical network, and in particular, to an optical fiber amplifier.

2. Description of the Related Art

An erbium-doped fiber amplifier (EDFA) amplifies an optical signal of 1.5 $\mu$m band, being a low-loss region of an optical fiber, and for this feature, is widely used for an optical communication system. In particular, the EDFA having both a high gain and a low noise figure (NF), has a function of extending a distance between amplifiers in an long-distance optical transmission system, and compensates for a switching loss and a distribution loss in an optical network. Therefore, the EDFA is an essential element in realizing an economical, effective optical communication system.

However, a common EDFA having a single-stage structure can be hardly made such that it has both the high gain and the low noise figure, due to the feature of an erbium-doped fiber (EDF). Therefore, a study has been made of a multi-stage EDFA having both the high gain and the low noise figure.

In an optical communication system, the multi-stage amplifier is made such that a first stage has the low noise figure and the next stage(s) has the high gain and the high output power. Further, in order to increase an efficiency of a pump laser, the multi-stage amplifier includes an optical isolator, a bandpass filter, an optical circulator, a pump reflector and an attenuator between the stages, so as to reduce ASE (Amplified Spontaneous Emission) noise.

However, in the conventional optical fiber amplifier including the bandpass filter to increase the efficiency of the amplifier, a gain bandwidth of the amplifier is limited by a bandwidth of the bandpass filter.

The following patents each discloses features in common with the present invention but do not teach or suggest the specifically recited optical fiber amplifier using a synchronized etalon filter of the present invention: U.S. Pat. No. 5,521,753 to Fake et al., entitled *Multi-Stage Fiber Amplifier,* U.S. Pat. No. 5,280,383 to Federici et al., entitled Dual-Stage Low Power Optical Amplifier, U.S. Pat. No. 5,566,018 to Lee et al., entitled Apparatus For Adjusting Channel Width Of Multi-Channel Fiber Amplifier Light Source, U.S. Pat. No. 5,808,787 to Meli et al., entitled Amplified Telecommunication System For Wavelength-Division Multiplexing Transmissions, U.S. Pat. No. 5,815,308 to Kim et al., entitled Bidirectional Optical Amplifier, U.S. Pat. No. 5,623,362 to Mitsuda et al., entitled Erbium-Doped Fiber Amplifier And An Optical Fiber Communication System, U.S. Pat. No. 5,295,217 to Marcerou et al., entitled Amplifier Having An Amplifying Optical Fiber, U.S. Pat. No. 5,815,518 to Reed et al., entitled Article Comprising A Cascaded Raman Fiber Laser, U.S. Pat. No. 5,831,754 to Nakano, entitled Optical Amplifier, U.S. Pat. No. 5,838,487 to Nilsson et al., entitled Optical Amplifiers, U.S. Pat. No. 5,778,132 to Csipkes et al., entitled Modular Optical Amplifier And Cassette System, U.S. Pat. No. 5,710,659 to Cline, entitled Low Tilt, High Gain Fiber Amplifier, U.S. Pat. No. 5,664,131 to Sugiya, entitled Light Amplifier, U.S. Pat. No. 5,677,786 to Meli, entitled Device For Reducing The Optical Noise Due To Four Wave Mixing, U.S. Pat. No. 5,701,194 to Meli et al., entitled Amplified Telecommunication System For Wavelength-Division Multiplexing Transmissions Capable Of Limiting Variations In The Output Power, U.S. Pat. No. 5,497,265 to Fontana et al., entitled High-Power Signals Optical Generator For Telecommunication Systems, U.S. Pat. No. 5,260,823 to Payne et al., entitled Erbium-Doped Fiber Amplifier With Shaped Spectral Gain, U.S. Pat. No. 5,550,671 to Simpson et al., entitled Intra-Cavity Optical Four-Wave Mixer And Optical Communications System Using The Same, U.S. Pat. No. 5,808,788 to Park et al., entitled Optical Fiber Amplifier, U.S. Pat. No. 5,434,877 to Chung, entitled Synchronized Etalon Filters, and U.S. Pat. No. 5,440,417 to Chung et al., entitled System For Spectrum-Sliced Fiber Amplifier Light For Multi-Channel Wavelength-Division-Multiplexed Applications.

SUMMARY OF THE INVENTION

It is therefore an object of the present invention to provide an optical fiber amplifier having a high gain, a high output power and a low noise figure, without limiting a gain bandwidth.

To achieve the above object, there is provided a multi-stage optical fiber amplifiers including at least two stage of cascade connected optical fiber amplifiers. A synchronized etalon filter is inserted between the optical fiber amplifiers. The etalon filter has a resonant frequency matched with a standard frequency of a WDM (Wavelength Division Multiplexing) system using the optical fiber amplifiers.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
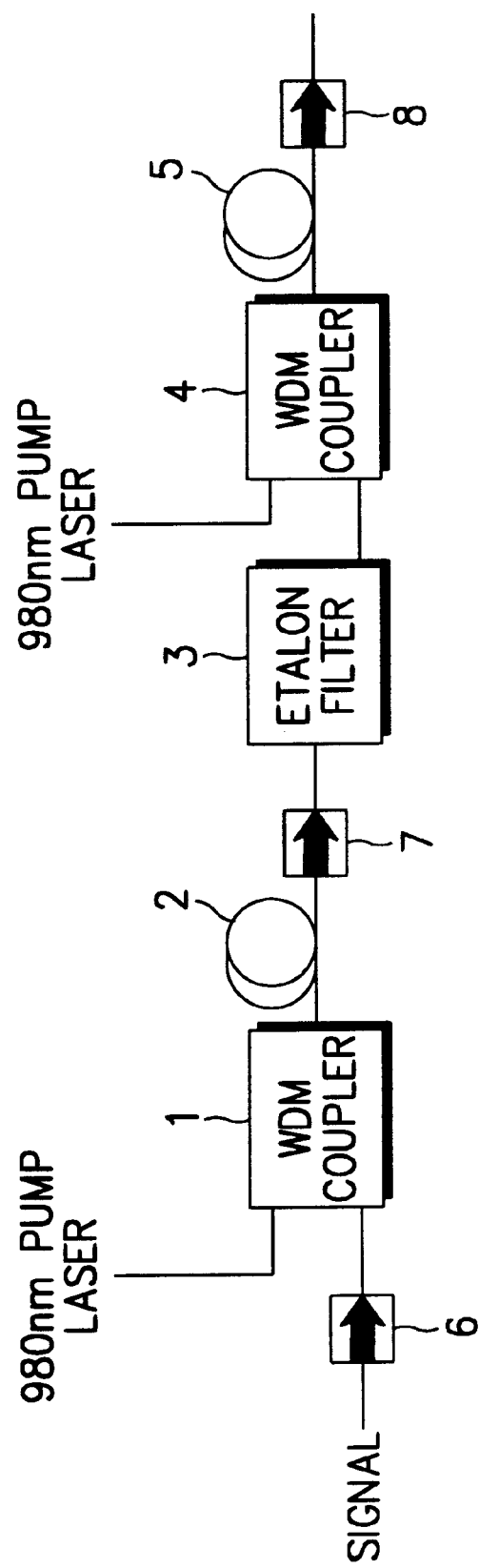
FIG. 1 is a schematic block diagram of a two-stage optical fiber amplifier using a synchronized etalon filter according to an embodiment of the present invention.

FIG. 1 illustrates a block diagram of a two-stage optical fiber amplifier using a synchronized etalon filter according to an embodiment of the present invention. In FIG. 1, an input optical signal is supplied to a WDM (Wavelength Division Multiplexing) coupler 1 through an optical isolator 6. The WDM coupler 1 WDM couples the optical signal input from the optical isolator 6 to a pump laser and provides the WDM coupled optical signal to an EDFA 2. A pump laser having a wavelength of 980 nm is used. However, a pump laser having a wavelength of 1480 nm is also used. The EDFA 2 amplifies an output signal of the WDM coupler 1 to a proper level for transmission. An etalon filter 3, connected to an output of the EDFA 2 through an optical isolator 7, filters an output signal of the EDFA 2. For the etalon filter 3, a synchronized etalon filter is used having a resonant frequency matched with an operating frequency of the WDM signal.

A solid-state etalon filter has periodic resonant frequencies at intervals of a specific FSR (Free-Spectral-Range). This solid-state etalon filter having the resonant frequency matched with standard frequencies is called "a synchronized etalon filter". Accordingly, the synchronized etalon filter 3 applied to the present invention has passbands matched with the standard frequencies. Thus, the output signal of the EDFA 2 is filtered by the synchronized etalon filter 3 having the passbands matched with the standard frequencies.

By inserting the synchronized etalon filter 3 between two EDFA states, i.e., between the EDFA 2 and an EDFA 5, it is possible to reduce the ASE noise, thus providing an improved optical fiber amplifier. Further, the EDFA using the synchronized etalon filter 3 can also be used for a WDM system. The WDM system transmits lasers of different wavelengths through a strand of the optical fiber to maximize a capacity of the optical communication system.

In order to secure a reliability of the WDM system and facilitate maintenance of the WDM system, the laser being an optical source of the respective channels should operate precisely at the standard frequencies specified by ITU (International Telecommunication Union). The resonant frequencies of the synchronized etalon filter 3 can be matched with the standard frequencies specified by ITU through a relatively simple process.

Therefore, in the WDM system having a stable wavelength, it is possible to pass the signal without loss and reduce the ASE noise according to the transmission characteristic of the filter, by matching the frequencies of the respective lasers with the resonant frequencies of the etalon filter 3 in the EDFA. The EDFA using the synchronized etalon filter 3 can improve the performance without limiting the gain bandwidth, as compared with the existing EDFA using the bandpass filter.

An output signal of the etalon filter 3 is supplied to a WDM coupler 4 and the WDM is coupled to a pump laser having a wavelength of 980 nm. The EDFA 5 amplifies an output signal of the WDM coupler 4 to a proper level for transmission. An output signal of the EDFA 5 is transmitted through an optical isolator 8.

As described above, the proposed novel optical fiber amplifier has a two stage structure. In the embodiment, the EDF of the first stage has a length of 14 m and the EDF of the second stage has a length of 22 m. The input signal of each stage is forward pumped into 30 mW by the pump laser having a wavelength of 980 nm.

By inserting the synchronized etalon filter 3 and the optical isolator 7 between the first and second stages, the ASE noise is reduced, which results in improvement of the amplifier. A method of inserting the optical isolator into the optical fiber amplifier to remove the backward-traveling ASE noise is widely used. The optical isolator 7 disposed at the front of the etalon filter 3 not only removes the backward-traveling ASE noise but also suppresses the reflection by the filter. The etalon filter 3 is disposed at the rear of the optical isolator 7 to reduce the ASE noise generated in the first stage according to the transmission characteristic of the filter.

If the ASE noise generated in the optical fiber amplifier of the first stage is reduced in this manner, the pump laser of the second stage is used more effectively in amplifying the signal, thereby improving the performance of the optical fiber amplifier.

Figure 2:
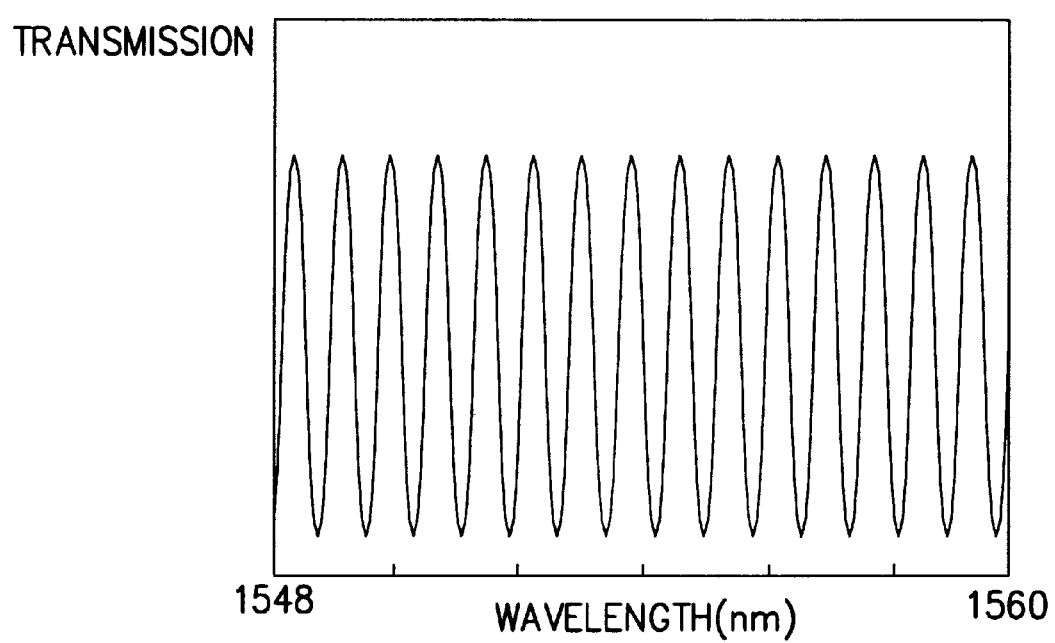
FIG. 2 is a diagram illustrating a transmission characteristic curve of the etalon filter (3) of FIG. 1.

FIG. 2 illustrates a transmission characteristic curve of the synchronized etalon filter 3. As stated above, FIG. 2 shows the resonant frequencies having regular intervals of FSR. By matching the resonant frequencies with the standard frequencies of the laser, these resonant frequencies can be easily used in the stabilized WDM system. That is, the synchronized etalon filter 3 passes the WDM signals having the frequencies matched with the passbands and removes the ASE noise according to the transmission characteristic. The etalon filter 3 applied to the present invention has the RSF of 100 GHz, the finesse of about 5 and the insertion loss of 2.4 dB.

Figure 3:
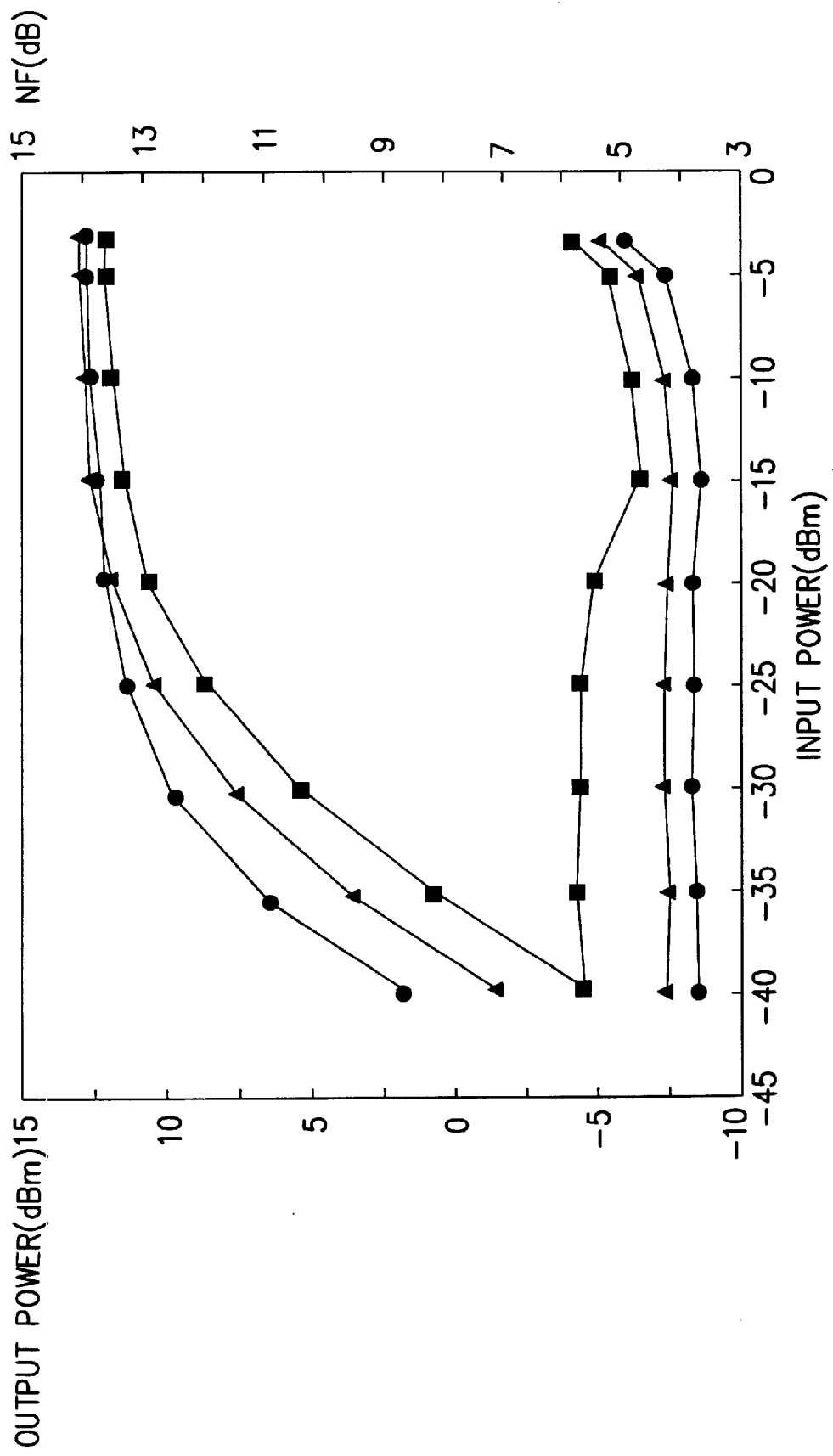
FIG. 3 is a diagram illustrating an output power and a noise figure with respect to a change of an input power in the optical fiber amplifier.

FIG. 3 illustrates an output power and a noise figure with respect to a change of an input power in the optical fiber amplifier, wherein the curves represented by "●" show a performance of the novel optical fiber amplifier using both the optical isolator 7 and the etalon filter 3 between the stages, the curves represented by "▲" show a performance of the conventional optical fiber amplifier using only the optical isolator 7 between the stages, and the curves represented by "■" show a performance of the conventional optical fiber amplifier using only the etalon filter 3 between the stages. That is, FIG. 3 shows the output powers and the noise figures, for the above three cases, measured by changing the input optical signal power of the optical fiber amplifier. Here, the input optical signal has a wavelength of 1549.1 nm. For the input signal of −40 dBm, a small signal gain and the noise figure of the proposed novel optical fiber amplifier were measured as 42.1 dB and 3.8 dB, respectively. In FIG. 3, the three upper curves show the output powers with respect to the input powers and the three lower curves show the output noise figures.

It can be understood from the foregoing description that the novel optical fiber amplifier has the small signal gain and the noise figure increased by 3.2 dB and 0.6 dB, respectively, as compared with the optical amplifier using only the optical isolator. A dynamic rage, one of the parameters indicating the performance of the optical fiber amplifier, shows a change of the output power of the optical fiber amplifier according to a change of the input power, and is defined by an input power where a saturated output power is decreased by 3 dB. The optical power amplifier, having a wide dynamic range, provides a constant output power even with the change of the input power, thereby improving the system reliability.

It can be understood that the dynamic range of the inventive optical fiber amplifier in improved by about 5 dB as compared with other optical fiber amplifiers. Further, the inventive optical fiber amplifier has the saturated output power of 13.5 dBm which is very similar to that of the optical fiber amplifier using only the optical isolator. That is, even though the synchronized etalon filter 3 is inserted between the optical fiber amplifiers, the output power is not reduced. The optical fiber amplifier using only the synchronized etalon filter 3 has the small signal gain and the noise figure reduced by 3.2 dB and 1.4 dB, respectively, as compared with the optical fiber amplifier using only the optical isolator. This is because the remaining backward-traveling ASE noise reduces (or suppresses) an inversion of erbium density in the optical fiber amplifier of the first stage.

However, when the input optical signal is, for example, higher than −20 dBm, the ASE noise is suppressed by the signal itself so that the influence of the backward-traveling ASE noise on the performance may be reduced. Therefore, according to uses, it is possible to make the two-stage optical fiber amplifier by using the synchronized etalon filter 3 instead of an optical isolator.

Figure 4:
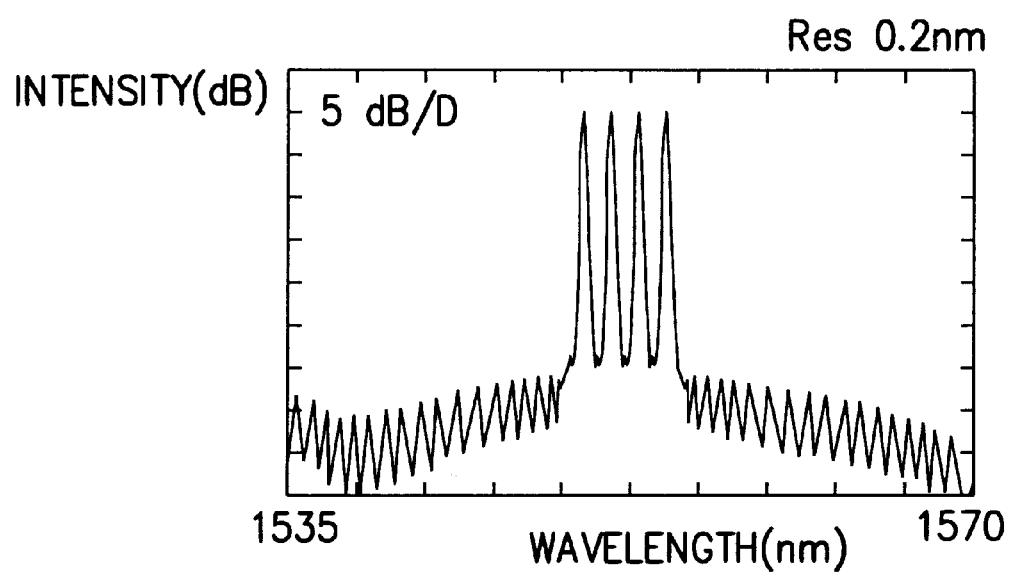
FIG. 4 is a diagram illustrating an output spectrum with respect to a WDM input signal in the optical fiber amplifier.

FIG. 4 illustrates an output spectrum with respect to the WDM signal in the novel optical fiber amplifier. In FIG. 4, "5 dB/D" indicates that the intensity per scale mark is 5 dB, and "Res 0.2 nm" indicates that the resolution of a measuring instrument is set to 0.2 nm. Further, FIG. 4 shows that the WDM signals have wavelengths of 1549.1 nm, 1550.7 nm, 1552.3 nm and 1553.9 nm, and the gap between the respective channels is 200 GHz. These wavelengths of the WDM signals are well matched with the resonant frequencies of the synchronized etalon filter 3. When the WDM input optical signals are −22 dBm for the respective channels, the output powers of the respective channels are all 6.9∓0.2 dBm. Furthermore, it is shown that the ASE noise is removed by the transmission characteristic of the synchronized etalon filter.

Figure 5:
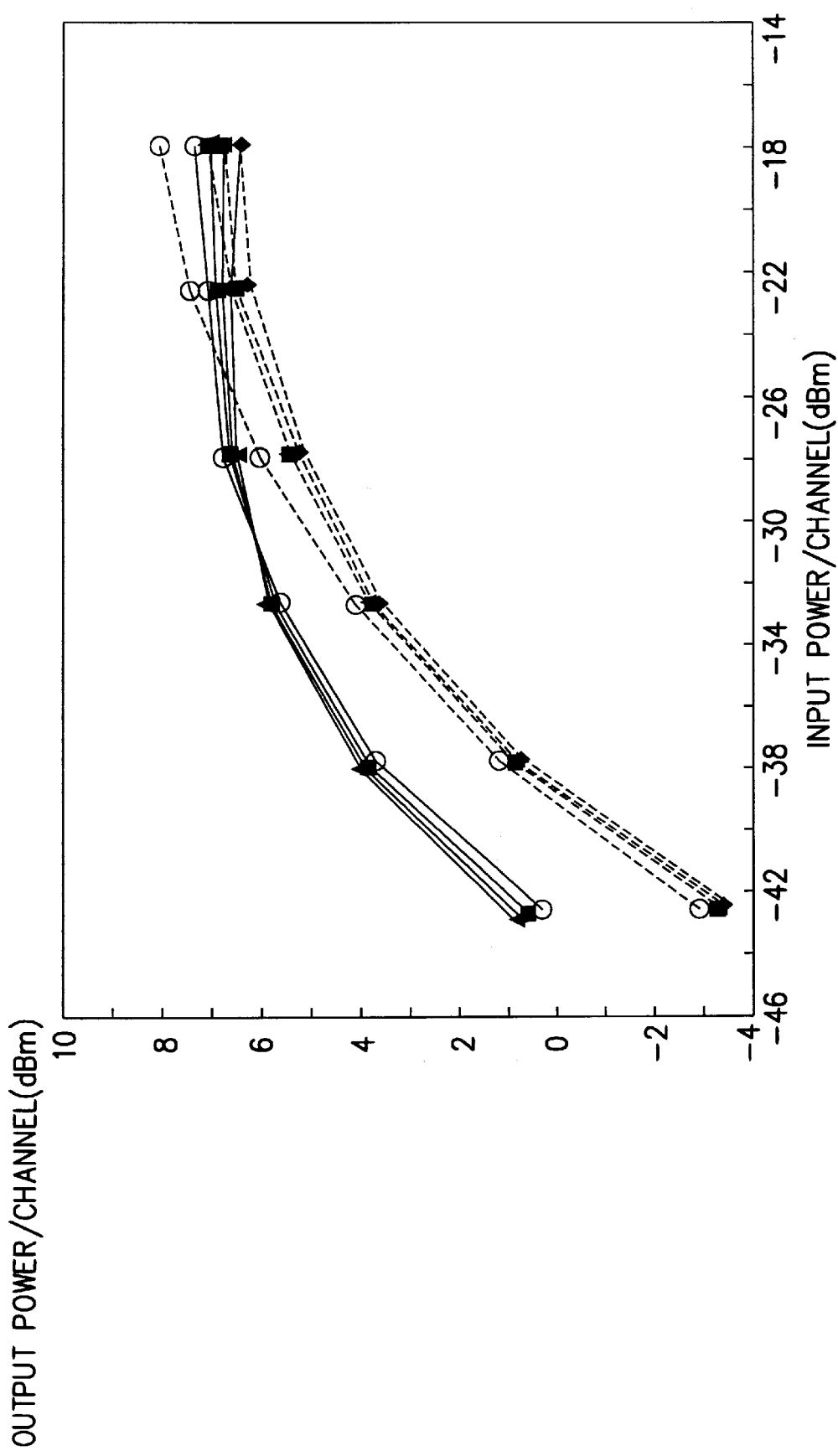
FIG. 5 is a diagram illustrating an output power with respect to a change of a WDM input power.

FIG. 5 illustrates an output power according to a change of the WDM input signal power, for the case of the inventive optical fiber amplifier and the conventional optical fiber amplifier using only the optical isolator. In FIG. 5, the WDM signals have wavelengths of 1549.1 nm, 1550.7 nm, 1552.3 nm and 1553.9 nm, the curves represented by the dotted lines indicate the output power of the inventive optical fiber amplifier and the curves represented by the solid lines indicate the output power of the conventional optical fiber amplifier using only the optical isolator. From FIG. 5, it can be understood that when the input power per channel ranges from −42 dBm to −17 dBm, the dynamic range (~20 dB) of the inventive optical fiber amplifier is improved by about 5 dB as compared with the dynamic range (~15 dB) of the conventional optical fiber amplifier using only the optical isolator. In addition, for the variation of the input power between −42 dBm and −17 dBm, the inventive optical fiber amplifier has the maximum power variation 0.8 DB which is smaller than the maximum power variation 1.4 dB of the conventional optical fiber amplifier using only the optical isolator. From the above results, it can be appreciated that the inventive optical fiber amplifier is suitable for the WDM system.

The synchronized etalon filter 3 used in the inventive optical fiber amplifier has a 3 dB 20 GHz bandwidth which is wide enough in transmitting 2.5 Gb/s signals. Therefore, if the wavelengths of the WDM signals are well matched with the resonant frequencies of the filter, the penalty of the receiving sensitivity due to the filter is negligible. To confirm this, a performance of the inventive optical fiber amplifier was measured. In measurement, four WDM light sources were simultaneously modulated by using an $LiNbO_3$ modulator and then transmitted through a 13 Km single mode optical fiber. The signals are amplified by using the inventive optical fiber amplifier and then demodulated by using a bandpass filter after attenuation. The demodulated signals are received through an APD (Avalanche Photodiode) and the bit error rate (BER) is measured for the received demodulation signals.

Figure 6:
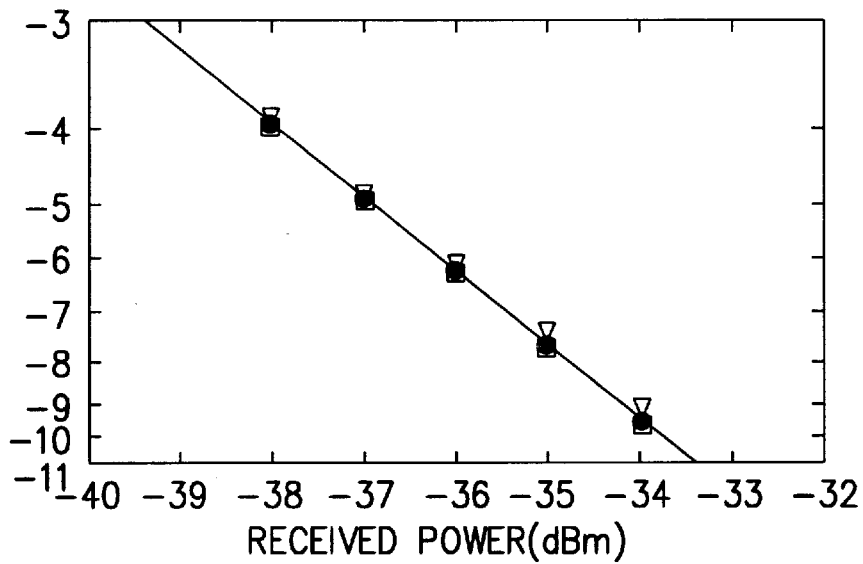
FIG. 6 is a diagram illustrating a measured bit error rate with respect to received power in the novel optical fiber amplifier.

FIG. 6 illustrates the measured bit error rate of the novel optical fiber amplifier with respect to a received power, wherein the WDM signals have wavelengths of 1549.1 nm, 1550.7 nm, 1552.3 nm and 1553.9 nm. The receiving sensitivity of the four channels was measured as −34∓0.1 dBm at the bit error rate $10^{-9}$. As can be appreciated from FIG. 6, the penalty of the receiving sensitivity due to the filter in the inventive optical fiber amplifier is negligible.

When several inventive optical fiber amplifiers are used in the long-distance transmission system or the optical network, the equivalent bandwidth of the filter is remarkably reduced. Therefore, the 3 dB bandwidth of the filter should be made to be wide enough. For example, if it is assumed that an approximately quadruple equivalent bandwidth of 10 GHz is required in order to transmit a 2.5 Gb/s optical signal without the penalty, the bandwidth of the filter used in the inventive optical fiber amplifier should be wider than 37 GHz in order to use ten inventive optical fiber amplifiers. However, since the bandwidth of the filter is inversely proportional to the small signal gain, it is important for the system user to determine an optimal 3dB bandwidth according to the using purposes.

Figure 7:
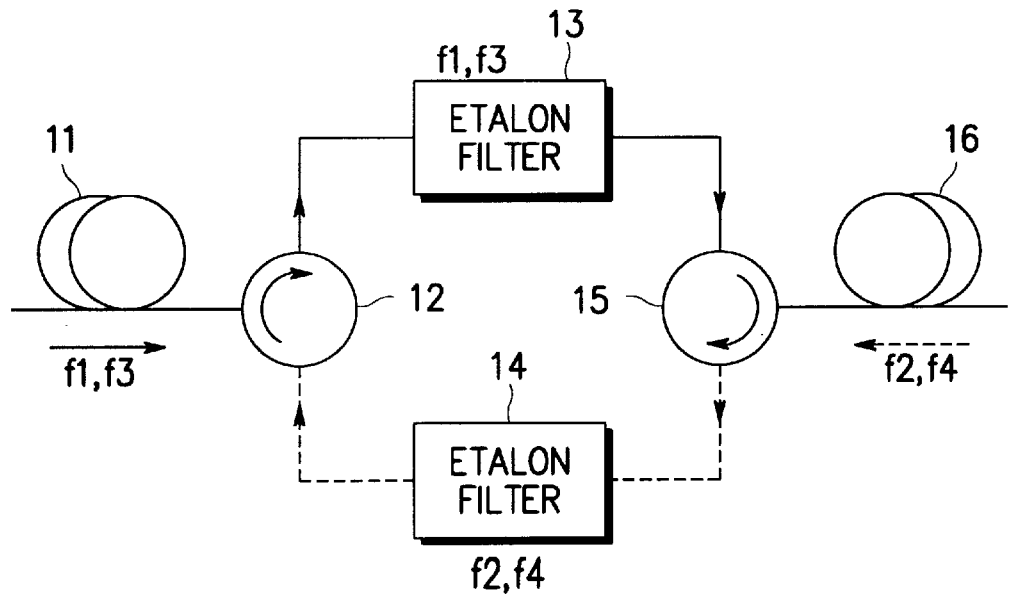
FIG. 7 is a schematic block diagram of a bidirectional optical fiber amplifier using synchronized etalon filters according to an embodiment of the present invention.

FIG. 7 illustrates a schematic block diagram of a bidirectional optical fiber amplifier using synchronized etalon filters according to an embodiment of the present invention. Since the optical signals travel bidirectionally in the bidirectional optical fiber amplifier, the optical isolator cannot be used. Therefore, the gain of the amplifier is restricted by the backward-traveling signal generated by Rayleigh back scattering and reflecting, and the phase noise is converted to the intensity noise thereby causing the penalty of the receiving sensitivity. To prevent this, conventionally, the optical path is divided for the optical signals traveling in the opposite directions by using optical circulators 12 and 15, and an optical isolator or grating is used in the divided paths.

However, as shown in FIG. 7, it is also possible to suppress the backward-traveling signal by using the synchronized etalon filters 13 and 14. That is, by differently adjusting the resonant frequencies of the etalon filters 13 and 14 used in different paths, the signal traveling in one direction can be passed while the signal traveling in another direction can be removed. For example, it is possible to remove the backward-traveling signal by using the etalon filter 13 which passes only the frequencies f1 and f3 in one direction and the etalon filter 14 which passes only the frequencies f2 and f4 in another direction.

As described above, the novel optical fiber amplifier using the synchronized etalon filter has the high gain, the high output power and the low noise figure, without limiting the gain bandwidth. Therefore, the novel optical fiber amplifier can be widely used in the WDM system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A multi-stage optical fiber amplifier comprising:
   at least two stages of cascade connected optical fiber amplifiers; and
   a synchronized etalon filter disposed between the at least two stages of optical fiber amplifiers, said etalon filter having a front end comprising an optical isolator, said isolator adapted for removing backward-traveling ASE noise and for suppressing reflection by the filter.

2. A multi-stage optical fiber amplifier comprising:

at least two stages of cascade connected optical fiber amplifiers; and a synchronized etalon filter disposed between the at least two stages of optical fiber amplifiers, said etalon filter having a resonant frequency matched with a standard frequency of a WDM (Wavelength Division Modulation) system using the at least two stages of optical fiber amplifiers.

3. A two-stage optical fiber amplifier comprising:

a first optical isolator coupled to an input optical signal;

a first WDM coupler for WDM coupling an optical signal output from the first optical isolator to a pump laser;

a first erbium-doped fiber amplifier (EDFA) for amplifying an output signal of the first WDM coupler;

a second optical isolator coupled to an output of the first EDFA;

a synchronized etalon filter for passing a wavelength division multiplexed signal output from the second optical isolator and for eliminating amplified spontaneous emission (ASE) noise;

a second WDM coupler for WDM coupling an optical signal output from the synchronized etalon filter to a pump laser;

a second EDFA for amplifying an output signal of the second WDM coupler; and a third optical isolator coupled to an output of the second EDFA.

4. A bidirectional optical fiber amplifier comprising:

first and second optical fiber amplifiers for respectively amplifying first and second optical signals traveling in opposite directions, the first and second optical signals having different frequencies;

first and second optical circulators coupled between the first and second optical fiber amplifiers, for separating a first path for the first optical signal from a second path for the second optical signal; and first and second etalon filters respectively disposed in the first and second paths, for selectively passing an optical signal traveling in one direction and removing an optical signal traveling in another direction.

5. A method of manufacturing a multi-stage optical fiber amplifier comprising the steps of:

(1) providing at least two stages of cascade connected optical fiber amplifiers; and (2) disposing a synchronized etalon filter between the at least two stages of optical fiber amplifiers, said etalon filter having a front end comprising an optical isolator, said isolator adapted for removing backward-traveling ASE noise and for suppressing reflection by the filter.

6. A method of manufacturing a multi-stage optical fiber amplifier comprising the steps of:

(1) providing at least two stages of cascade connected optical fiber amplifiers; and (2) disposing a synchronized etalon filter between the at least two stages of optical fiber amplifiers; and (3) providing said etalon filter with a resonant frequency matched with a standard frequency of a WDM (wavelength division modulation) system using the at least two stages of optical fiber amplifiers.

7. A method of manufacturing a two-stage optical fiber amplifier comprising the steps of:

(1) coupling an input optical signal to a first optical isolator;

(2) coupling an optical signal output from the first optical isolator to a pump laser with a first WDM coupler;

(3) providing a first amplifier stage for amplifying an output signal of the first WDM coupler with a first erbium-doped fiber amplifier (EDFA);

(4) coupling an output of the first EDFA to a second optical isolator;

(5) coupling a synchronized etalon filter to an output from the second optical isolator for passing a wavelength division multiplexed signal and for eliminating amplified spontaneous emission (ASE) noise;

(6) coupling an optical signal output from the synchronized etalon filter to a pump laser with a second WDM coupler;

(7) providing a second amplifier stage for amplifying an output signal of the second WDM coupler with a second EDFA; and (8) coupling an output of the second EDFA to a third optical isolator.

8. A method of manufacturing a bidirectional optical fiber amplifier comprising the steps of:

(1) providing a means for amplifying first and second optical signals traveling in opposite directions with first and second respective optical fiber amplifiers, the first and second optical signals having different frequencies;

(2) providing a means for separating a first path for the first optical signal from a second path for the second optical signal with first and second optical circulators coupled between the first and second optical fiber amplifiers; and (3) providing a means for selectively passing an optical signal traveling in one direction and removing optical an optical signal traveling in another direction with first and second etalon filters respectively disposed in the first and second paths.

* * * * *